United States Patent [19]

Weber

[11] Patent Number: 4,490,026

[45] Date of Patent: Dec. 25, 1984

[54] MOUNTING FOR AN AIRBORNE TELESCOPE

[75] Inventor: Hieronymus Weber, Konigsbronn-Zang, Fed. Rep. of Germany

[73] Assignee: Carl Zeiss-Stiftung, Heidenheim/Brenz, Fed. Rep. of Germany

[21] Appl. No.: 458,947

[22] Filed: Jan. 18, 1983

[30] Foreign Application Priority Data

May 21, 1982 [DE] Fed. Rep. of Germany ... 8214826[U]

[51] Int. Cl.³ .................... G02B 23/06; G02B 23/16
[52] U.S. Cl. ................................. 350/567; 350/505
[58] Field of Search ............... 350/567, 568, 289, 504, 350/505, 294, 500, 1.1, 1.2, 1.6

[56] References Cited

U.S. PATENT DOCUMENTS 3,580,363  5/1971  Plawner et al. ................. 350/567
4,395,095  7/1983  Horton ........................... 350/504

OTHER PUBLICATIONS

Robert M. Cameron, "NASA's 91-cm. airborne Telescope", *Sky & Telescope*, Nov. 1976, pp. 327–331.

*Primary Examiner*—Jon W. Henry
*Attorney, Agent, or Firm*—Hopgood, Calimafde, Kalil, Blaustein & Judlowe

[57] ABSTRACT

A Cassegrain-type telescope includes a tertiary mirror for off-axis folding of the telescope-viewing axis, the tertiary mirror being located at offset from the center of gravity of the telescope. A first telescope-positioning drive is operative about the axis-folded output of the tertiary mirror and is therefore subject to varying imbalance torque; but a torque-motor auxiliary drive is operative about the same axis of telescope-positioning drive, to compensate for the imbalance torque.

13 Claims, 3 Drawing Figures

MOUNTING FOR AN AIRBORNE TELESCOPE

BACKGROUND OF THE INVENTION

The present invention relates to an aircraft-mounted telescope which is suspended on one side of a bulkhead or partition wall of the fuselage and is mounted for rotation or swing about two axes.

Such a telescope is known, for example, from "Sky and Telescope", November 1976 issue, pages 327 to 331. That telescope is a 90-cm infrared telescope which permits observations of astronomical objects in a spectral region in which ground-mounted observations cannot be performed, due to attenuation in the earth's atmosphere.

This known apparatus can be tilted or swung through an angular range of about 4° with respect to the longitudinal axis of the airplane and is mounted for rotation within an angular range of about 40° in elevation, i.e., about an axis parallel to the flight-direction. The mounting consists of a gas-pressure bearing in the form of a ball-and-socket joint which is integrated in the partition wall which separates the observation space (which is open in viewing direction and is taken up by the telescope) from the operator's control space (which is kept at nominal pressure).

The known apparatus is balanced with respect to its two axes by means of counterweights and therefore is inherently of relatively great weight, a factor which makes it difficult to integrate the apparatus into the somewhat labile fuselage of an aircraft.

In the known apparatus, the instrument is a reflecting telescope and the center of gravity of the tube lies in the vicinity of the primary mirror and, therefore, at the lower end of the tube. The elevation axis is through this center of gravity, and therefore a relatively large telescope-viewing window must be provided in the fuselage. Such a window is difficult to provide, due, among other reasons, to considerations of stability.

BRIEF STATEMENT OF THE INVENTION

The object of the present invention is to provide an airborne-telescope mounting which is of relatively simple, light-weight construction and, furthermore, requires only a relatively small viewing opening in the fuselage, as compared with the range of swing of the telescope. This object cannot be achieved with conventional telescope mounts for land-based apparatus.

The invention achieves this object by providing a bulkhead mount wherein at least one of the axes of rotation does not extend through the center of gravity of the part to be swung and wherein an additional torque motor is provided to compensate for the imbalance.

The axis associated with the larger range of swing is advisedly located outwardly, at offset from the center of gravity, in the telescope-viewing direction. Such a displacement of the rotary axis, in the direction toward the viewing opening, enables the opening in the fuselage to be kept small.

The use of torque motors rather than counterweights to compensate for imbalance eliminates the need for and the weight of counterweights.

It is not advisable for the elevation axis of rotation to be at the plane of the viewing opening since then the moments to be compensated would be too great. As a rule, however, a compromise will be found between the concurrent requirements of reduction in size of the viewing window and reduction in amount of the imbalance to be compensated.

Advantageously, a Cardan joint mounts the telescope on one side of a bulkhead or partition wall of the aircraft. The Cardan joint permits the two swinging movements to be independent of each other, in elevation and in the direction of the longitudinal aircraft axis, and control of these movements can be handled well on the other side of the partition.

DETAILED DESCRIPTION

The invention will be described in detail in conjunction with the accompanying drawings, in which.

Figure 1:
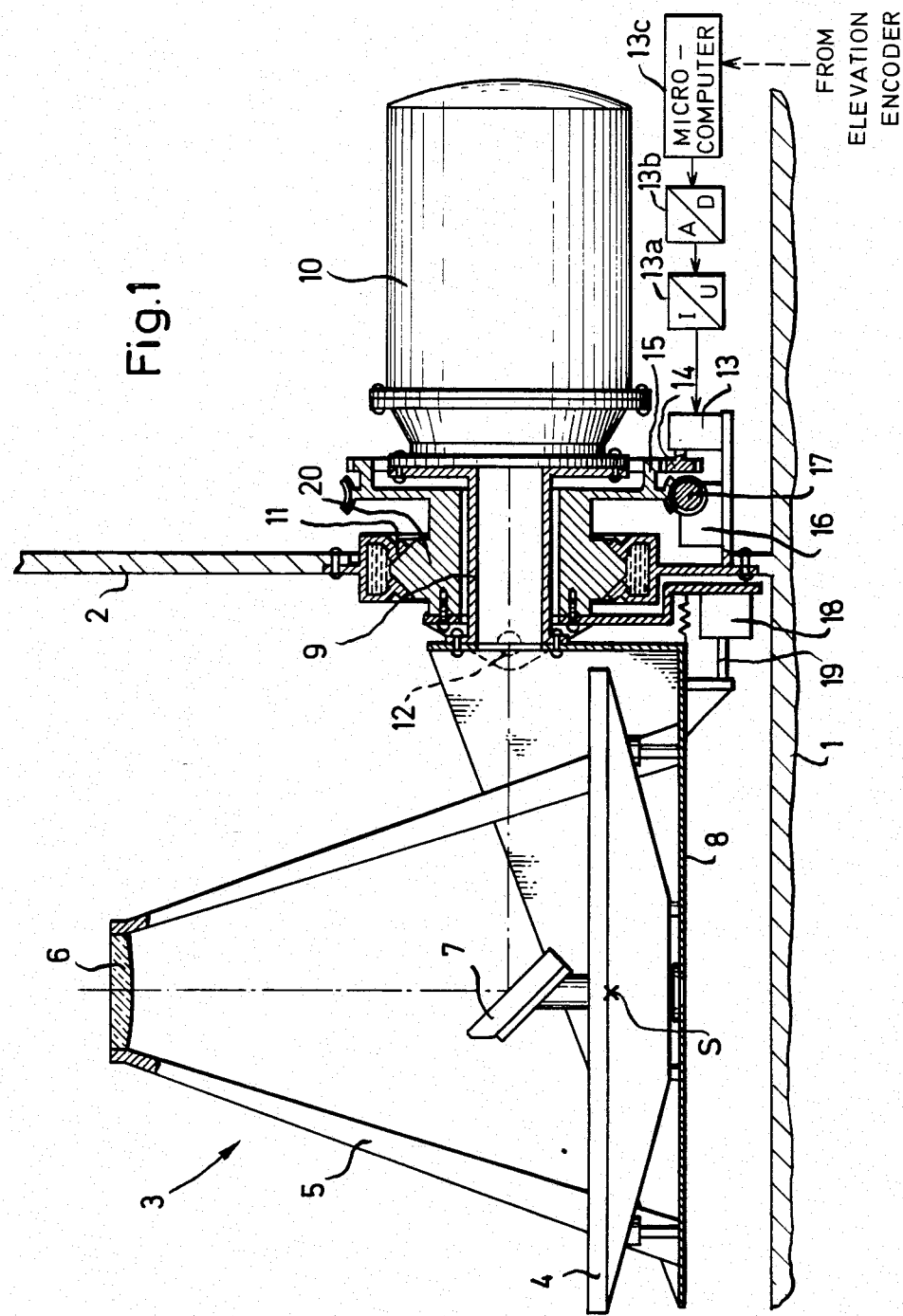
FIG. 1 is a view in side elevation, with a portion in vertical section, for a first embodiment of the invention.
Figure 2:
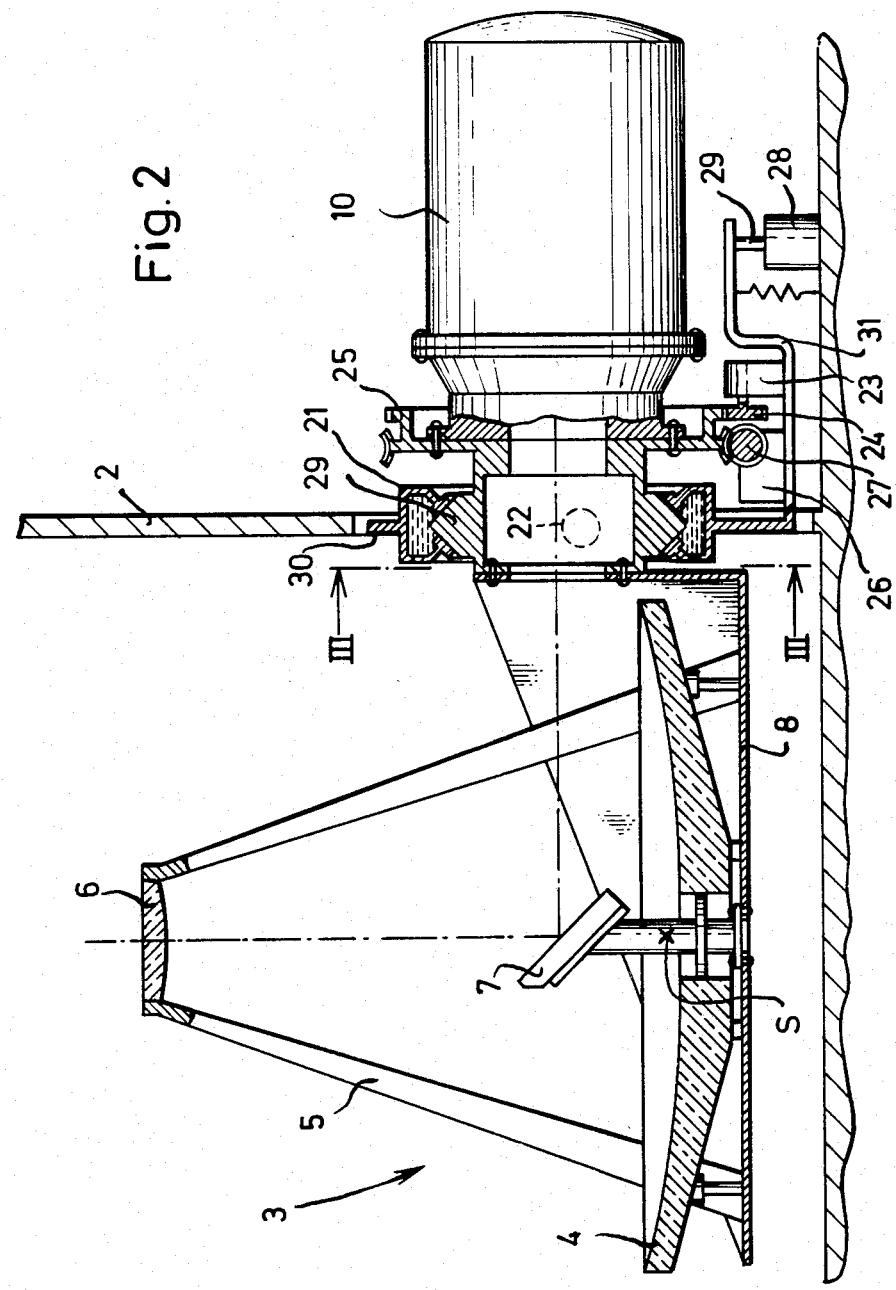
FIG. 2 is a similar view for a second embodiment.

The telescope 3 in FIGS. 1 and 2 comprises a back-end primary mirror 4, and a front-end secondary mirror on the viewing axis of the telescope; and a tertiary mirror 7 reflects the beam coaxially with a first axis of rotation of the telescope and into a hermetically closed container 10; this first axis of rotation is parallel to the longitudinal aircraft axis. The receiving unit (not further shown) for radiation to be detected is located in the image plane of the telescope 3, within container 10.

The telescope 3 is carried by a base 8 which is swingable or tiltable in two directions and is supported on one side of a bulkhead or partition wall 2 of an aircraft fuselage 1. This partition wall separates a space for telescope 3, which will be understood to be provided with a viewing opening in the fuselage and, therefore, to be subject to outside pressure, from the interior of the fuselage, which is maintained at normal pressure. And, to avoid front windows in the beam path, with attendant manufacturing difficulties to achieve response in the longer-wave spectral region, the inside of the container 10 is also exposed to outside pressure.

Container 10 and telescope 3 are rigidly interconnected by a hollow shaft 9 which, in the embodiment of FIG. 1, is supported for tilting about a second axis 12. Bearing brackets to serve the tilt axis 12 and secured to a ring 20 which, in turn, is mounted for rotation via an oil-pressure bearing 11 in the partition wall 2. The tilt axis 12, about which the telescope can be tilted (within a plane containing the longitudinal aircraft axis), accommodates tilt within a small range of angles up to about 4°; and the rotary axis of bearing 11 enables the telescope to swing in elevation within an angular range of approximately 60°. Together, these rotary axes are accommodated by a Cardan joint in which the telescope is suspended on one side of the partition.

To tilt the telescope in the longitudinal direction, a connecting-rod drive 18, 19 is provided, with bracket suspension from ring 20, on one side of the partition. The elevation drive, on the other hand, consists of a motor 16 with worm gear 17, engaged to a worm-wheel formation of ring 20, on the other side of the partition.

The center of gravity S of telescope 3 lies below the axis of rotation determined by bearing 11, and this axis is at upward offset from S, i.e., in the viewing direction of the telescope. The imbalance which thereby occurs is compensated for by a torque motor 13, having spur-gear connection 14, 15 to the rotatable ring 20.

The orientation axes of the telescope will be understood to be equipped with digital encoders (not shown)

measuring elevation and azimuth angle values. For torque compensation, the digital output (Z) of the elevation encoder is fed to a microcomputer 13c, which calculates the function A·sin Z, according to which torque changes with changes in elevation; in this function, A represents the telescope mass, times its offset from the axis of bearing 11 (21), a value constantly programmed into the computer. The calculated function is converted into an analog voltage by a digital/analog converter 13b, and the analog output from 13b is used to control a power supply 13a, which feeds motor 13 with a voltage-dependent current I. The current I will thus be seen to be proportional to the torque to be compensated. Preferably, motor 13 is a samarium-cobalt permanent-magnet DC motor, for good response linearity and low ripple in its torque/current characteristic.

Figure 3:
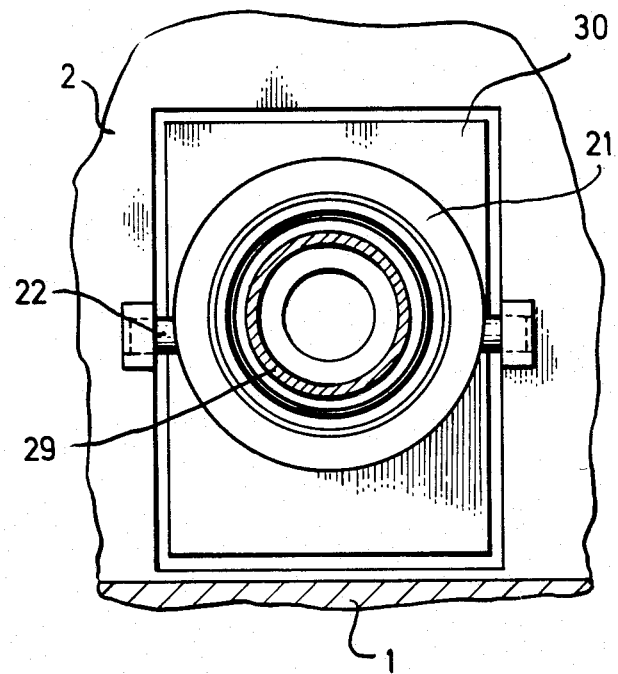
FIG. 3 is a sectional view, taken along the line III—III of FIG. 2.

The embodiment of FIGS. 2 and 3 differs from the situation described above for FIG. 1, in that the rotary bearing 21, 29 is mounted indirectly via a swinging frame 30, at an opening in the partition wall 2. Frame 30 is, in turn, swung about tilt axis 22 by a connecting-rod drive 28, 29 which acts on a bracket or arm part 31 of frame 30. In the case of FIGS. 2 and 3, the connecting-rod drive 28, 29 is mounted directly to the fuselage 1.

A torque motor 23, with spur-gear connection 24, 25 to ring 29, provides compensation for imbalance about the longitudinal axis; and bracket 31 (of ring 29) mounts a motor 26 with worm gearing 27, for fine adjustment of telescope elevation.

For reasons of FIG. 2 simplification, a pressure-tight yieldable cuff has not been shown but will be understood to seal the space between frame 30 and the partition wall 2. Such a cuff will also be understood to be provided in the FIG. 1 embodiment, to seal off the space between bearing ring 20 and the hollow shaft 9.

What is claimed is:

1. An airborne telescope and a suspension therefor adapted to suspend the telescope from and at one side of an aircraft bulkhead or fuselage partition, said suspension providing for telescope rotation or swing about two axes (11, 12; 21,22), characterized by the fact that at least one of the axes of rotation (11; 21) intersects the telescope axis at offset from the center of gravity (S) of the telescope (3), and that a torque motor (13; 23) is provided to compensate for telescope imbalance about said one axis of rotation.

2. A telescope according to claim 1, characterized by the fact that said one axis (11; 21) has a larger range of swing than the second axis, and said offset from the center of gravity (S) is in the viewing direction of the telescope (3).

3. A telescope according to claim 1, characterized by the fact that the telescope (3) is mounted on one side of a partition wall (2) by means of a Cardan joint (11, 12; 21, 22).

4. A telescope according to claim 3, characterized by the fact that the Cardan joint consists of a rotatable bearing member (21, 29) which is carried by a swing frame (3) recessed into and pivotally suspended from the partition wall.

5. A telescope according to claim 3, characterized by the fact that the Cardan joint consists of a swing bearing (12) which is carried by a rotation bearing (11, 20) which is recessed in the partition wall.

6. A telescope according to claim 5, characterized by the fact that the rotation bearing (11, 20; 21, 29) is developed as combined radial and axial bearing.

7. A telescope according to claim 6, characterized by the fact that the rotation bearing is developed as an oil-pressure bearing.

8. A telescope according to claim 5, characterized by the fact that the swing bearing (12; 22) is formed by a transverse bar.

9. An airborne telescope adapted for suspension from and at one side of an aircraft bulkhead or fuselage partition, said telescope having a primary mirror, and a secondary mirror on the axis of and fixedly spaced from said primary mirror in the viewing direction, the center of gravity of said telescope being at substantially the primary-mirror end of the telescope, and a tertiary mirror on said axis and between said primary and secondary mirrors and folding secondary-mirror reflection laterally of the primary-mirror axis, said tertiary mirror being located at offset from said center of gravity in the direction toward said secondary mirror; suspension means for said telescope including a rotary bearing having an axis coincident with the axis of folded reflection from said tertiary mirror, first means including a drive motor for imparting rotary drive to said telescope about the bearing axis, and second means including a stalled-torque motor for imparting balancing torque to said telescope about the bearing axis.

10. The telescope of claim 9, in which said second means includes signal-generating means responsive to instantaneous elevational orientation (Z) of said telescope about said bearing axis and supplying to said motor a signal proportional to A·sin Z, where A represents the mass of the telescope, times its offset from said bearing axis.

11. An airborne telescope adapted for suspension from and at one side of an aircraft bulkhead or fuselage partition, said telescope having an axis extending between spaced front and back ends and in a viewing direction beyond the front end, the center of gravity of said telescope being at substantially the back end of the telescope; suspension means for said telescope including a rotary bearing on an axis intersecting the telescope axis at offset from the center of gravity in the direction toward the front end, first means including a drive motor for imparting rotary drive to said telescope about the bearing axis, and second means including a stalled-torque motor for imparting balancing torque to said telescope about the bearing axis.

12. The telescope of claim 11, in which said bearing axis is the first of two orthogonally related bearing axes of telescope orientation, said bearing axes providing different ranges of limited angular displacement, and said first bearing axis providing the greater range of angular displacement of the telescope.

13. The telescope of claim 11, in which said second means includes signal-generating means responsive to instantaneous elevational orientation (Z) of said telescope about said bearing axis and supplying to said motor a signal proportional to A·sin Z, where A represents the mass of the telescope, times its offset from said bearing axis.

* * * * *